United States Patent [19]
Foss et al.

[11] Patent Number: 5,783,778
[45] Date of Patent: Jul. 21, 1998

[54] CABLE SEALING AND LOCKING DEVICE

[75] Inventors: Raymond Charles Foss; Andrew Stephen Cammack, both of Plymouth, England

[73] Assignee: Bowthorpe PLC, West Sussex, England

[21] Appl. No.: 609,496

[22] Filed: Mar. 1, 1996

[51] Int. Cl.$^6$ .................................................. H01R 13/58
[52] U.S. Cl. .................................................. 174/77 R
[58] Field of Search ........................ 174/77 R, 74 A, 174/76, 74 R

[56] References Cited

U.S. PATENT DOCUMENTS

| 4,525,000 | 6/1985 | Bachle | 285/177 |
| 4,924,038 | 5/1990 | Klosin et al. | 174/135 |
| 4,963,698 | 10/1990 | Chang et al. | 174/77 R |
| 5,451,717 | 9/1995 | Itou | 174/77 R |

FOREIGN PATENT DOCUMENTS

| 0 514 174 | 5/1992 | European Pat. Off. . |
| 1 450 565 | 7/1966 | France . |
| 1 290 214 | 3/1969 | Germany . |
| 0 402 653 | 5/1990 | Germany . |
| 0 546 288 | 10/1992 | Germany . |
| 251827 | 5/1926 | United Kingdom . |
| 262532 | 12/1926 | United Kingdom . |
| 702451 | 1/1954 | United Kingdom . |
| 1 590 536 | 6/1981 | United Kingdom . |
| 2 277 206 | 10/1995 | United Kingdom . |

*Primary Examiner*—Kristine L. Kincaid
*Assistant Examiner*—Chau N. Nguyen
*Attorney, Agent, or Firm*—David P. Gordon

[57] ABSTRACT

A cable locking and sealing device has an elongate body of elastomeric material formed with at least one through-passage for receiving a cable and at least one longitudinal slit extending down at least a portion of its length. The interior of the through passage is formed with a series of annular ribs which each taper in depth towards a point adjacent the longitudinal slit. When the device is pulled into an entry port, its elongate body becomes radially compressed thereby holding the cable firmly in place; however, the sealing effect of the ribs against the cable is not compromised by any relative longitudinal displacement of the portions of the body either side of the slit.

9 Claims, 4 Drawing Sheets

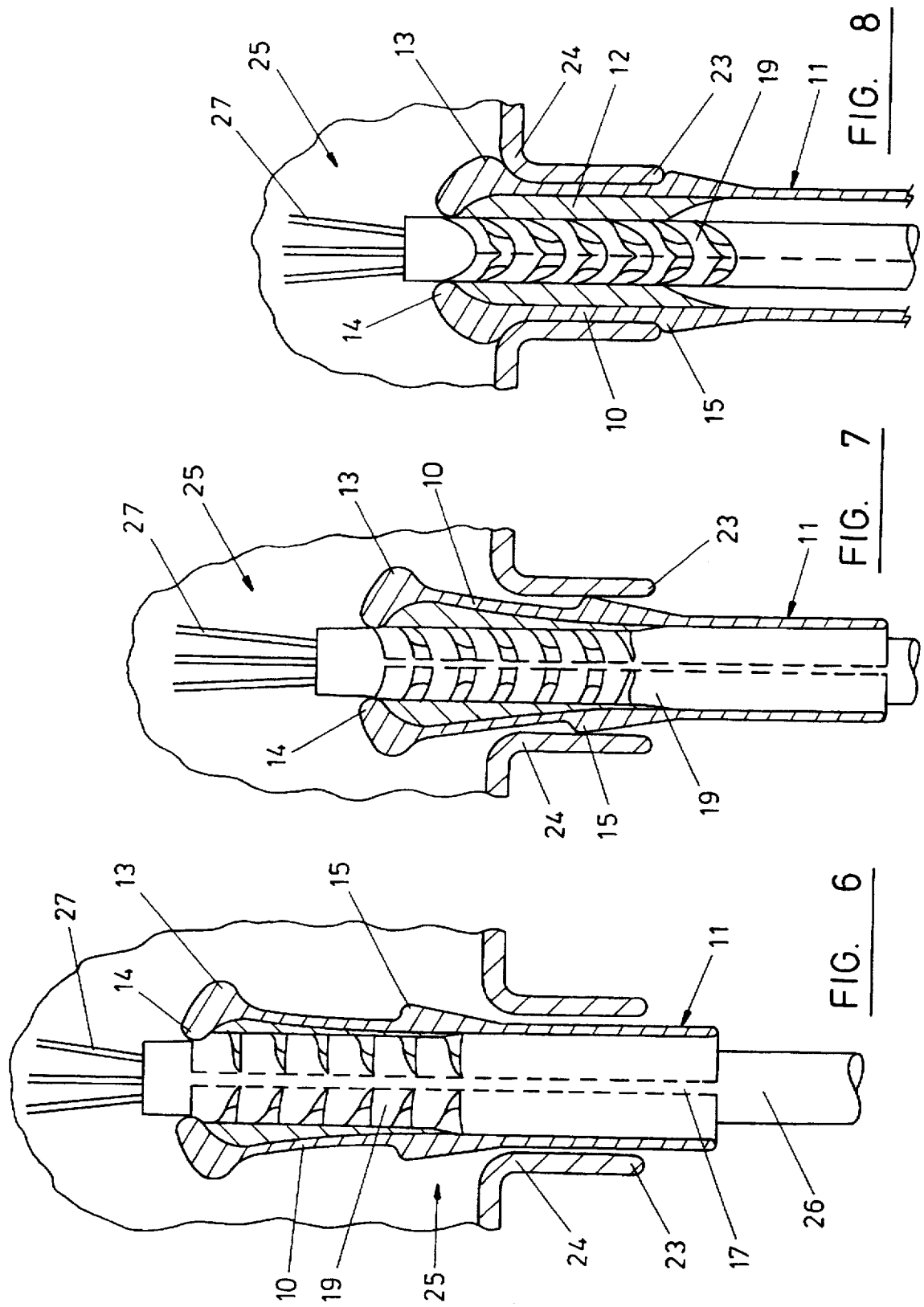

CABLE SEALING AND LOCKING DEVICE

BACKGROUND OF THE INVENTION

This invention relates to a device for sealing and locking a cable entering or leaving a cable splice closure or the housing of electrical or passive optical fibre equipment. The device is particularly suitable for optical fibre cables, but may be used with a wide range of other types of cable, for example copper conductor or coaxial cables.

SUMMARY OF THE INVENTION

Various types of sealing and locking devices are known, for use on power or telecommunications cables to seal against the ingress of moisture and foreign matter into a splice closure or equipment housing which the cable enters, and also to resist the cable being pulled. Our co-pending application WO94/24/47 describes a cable locking and sealing device which comprises an elongate tubular body of elastomeric material for receiving a cable therethrough, and arranged to be pulled into an entry port so that the tubular body of the device becomes radially compressed between the cable and the entry port. In one embodiment of this device, the interior of the tubular body is formed with a series of annular ribs, which provide an effective method of sealing and locking a cable. However, in order to use the above-described device effectively, it is necessary to have easy access to the ends of the cable to be sealed and locked. In many applications, a long length of cable is used and portions of its length are required to be locked and sealed at various intervals. Thus, a device capable of efficiently locking and sealing either ends or loops of cable is required.

It has been proposed to provide a slit between the through-passage running through the body and the edge of the body or, in the case of an elongate body having two parallel through-passages, a slit between the two through-passages. However, this may lead to a slight displacement of the annular ribs such that they no longer co-operate effectively and moisture may be permitted to enter the through-passage and thus damage the cable sealing device.

We have now devised an arrangement which overcomes the problem outlined above.

In accordance with the present invention there is provided a cable locking and sealing device, which comprises an elongate body of elastomeric material having at least one through-passage for receiving a cable therein, said body having at least one longitudinal slit therein which extends down at least a portion of its length, the interior of said at least one through-passage being formed with a series of annular ribs which taper in depth towards a point adjacent said at least one longitudinal slit, the cable locking and sealing device being arranged to be pulled into an entry port so that the body of the device becomes radially compressed between the cable and the entry port.

The section or the through-passage immediately adjacent the longitudinal slit is smooth, such that any displacement of the body as a result of the slit does not affect the annular ribs. The ribs, therefore, continue to co-operate effectively in order that a seal may be created around the cable when the device is in use which allows no moisture or other substance to enter the through-passage.

Preferably the elongate body of the device is formed with two annular, external projections, one at or adjacent one end of the body and the other intermediate the two ends of the body. These two annular projections are arranged to abut opposite ends of the entry port, when the device is installed in the entry port, to prevent movement of the device in either axial direction.

The body of the device may comprise an outer sleeve of relatively incompressible elastomeric material, and an inner sleeve of relatively soft and compressible elastomeric material.

The tubular body of the device may have a single duct or through-passage and a longitudinal slit between the through-passage and the outer edge of the body. Alternatively, it may have two through-passages side-by-side. In this case, the through passages may be joined via a longitudinal slit. Alternatively, slits may be provided between each through-passage and the outer edge of the tubular body. The slits may extend down the entire length of the body, or a portion thereof.

The series of annular ribs may be formed down the entire length of the or each through-passage, or may alternatively only be formed down a portion thereof. The interior of the or each through-passage may have a generally uniform diameter down its length, or may alternatively comprise a portion which tapers internally from a point intermediate the two ends of the through-passage to one end of the through-passage.

Embodiments of the present invention will now be described by way of examples only and with reference to the accompanying drawings.

BRIEF DESCRIPTION OF THE DRAWINGS

FIG. 6 is a longitudinal section through the cable locking and sealing device of FIG. 5 fitted to a cable and at a first stage of introduction into a cable entry port;

FIG. 7 is a similar section showing the device at a later stage in the process of installation into the cable entry port;

FIG. 8 is a similar section showing the device when fully installed into the cable entry port;

DETAILED DESCRIPTION OF THE PREFERRED EMBODIMENT

Figure 1:
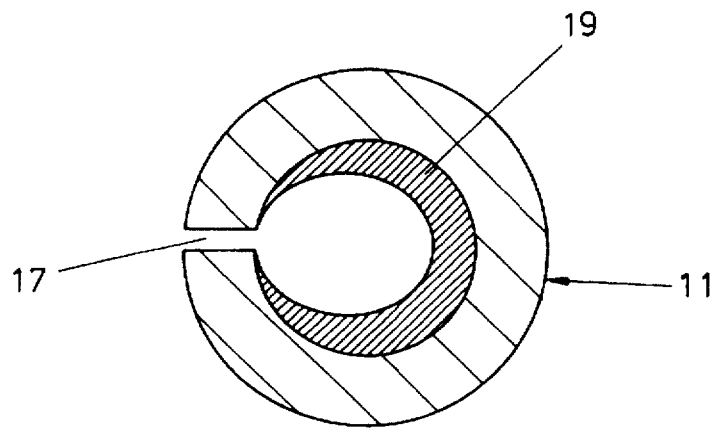
FIG. 1 is a plan view of a cable locking and sealing device according to the present invention.
Figure 2:
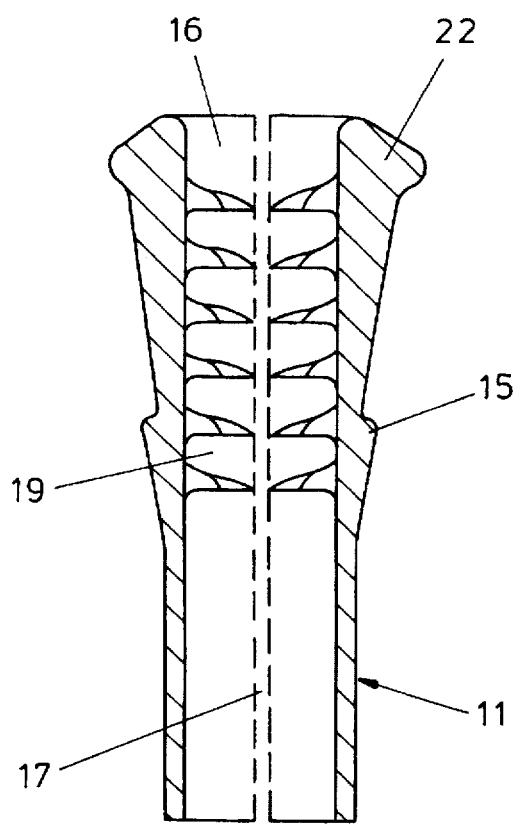
FIG. 2 is a longitudinal section through a cable locking and sealing device according to a first embodiment of the present invention.

Referring to FIGS. 1 and 2 of the drawings, a cable locking and sealing device in accordance with a first embodiment of the present invention comprises an elongate cylindrical body 11 formed of a resiliently flexible material and having generally uniform internal and external diameters. A first external annular projection 22 is formed around the upper end 16 of the body 11, and a second external annular projection is formed at or adjacent its mid-length. A longitudinal slit 17, which extends from the inner to the outer edge of the body 11 and which extends down its length, is provided. A series of annular ribs 19 are formed around the interior circumference of the cylindrical body, the ribs 19 being relatively compressible. The ribs 19 taper in depth towards both edges of the slit 17 such that the portions of the interior which are directly adjacent each side of the slit 17 are substantially smooth. Thus, any displacement of the body 11 due to the slit 17 does not affect the co-operation of the annular ribs 19 and, therefore, does not affect the sealing properties of the device.

Figure 3:
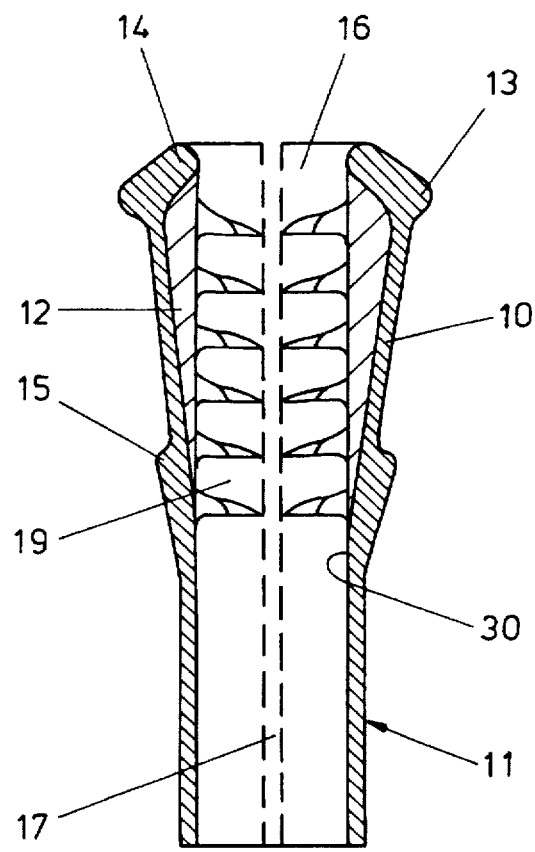
FIG. 3 is a longitudinal section through a cable locking and sealing device according to the first embodiment of the present invention, having an alternative construction.

Referring to FIG. 3 of the drawings, an alternative configuration of the cable sealing and locking device again comprises an elongate cylindrical body 11 having a longitudinal slit 17 formed therein and annular ribs 19, which taper towards the edges of the slit 17, formed around its interior circumference. However, in this case, the cylindrical body 11 comprises an outer sleeve 10 and an inner sleeve 12 which extends approximately one half of the length of the outer sleeve. The outer sleeve 10 tapers externally from the upper end 16 to approximately the end 30 of the inner sleeve, and has internal and external projections 14, 13 at the end 16. The outer sleeve 10 also has an external projection 15 at or adjacent its mid-length. The inner sleeve 12 tapers internally from its inner end 30, to merge with the inner periphery of the internal projection 14 at the end 16. Thus the inner diameter of the cylindrical body 11 is again generally uniform. The material of the inner sleeve 12 may be softer and therefore substantially more easily compressible than the material of the outer sleeve 10.

Figure 4:
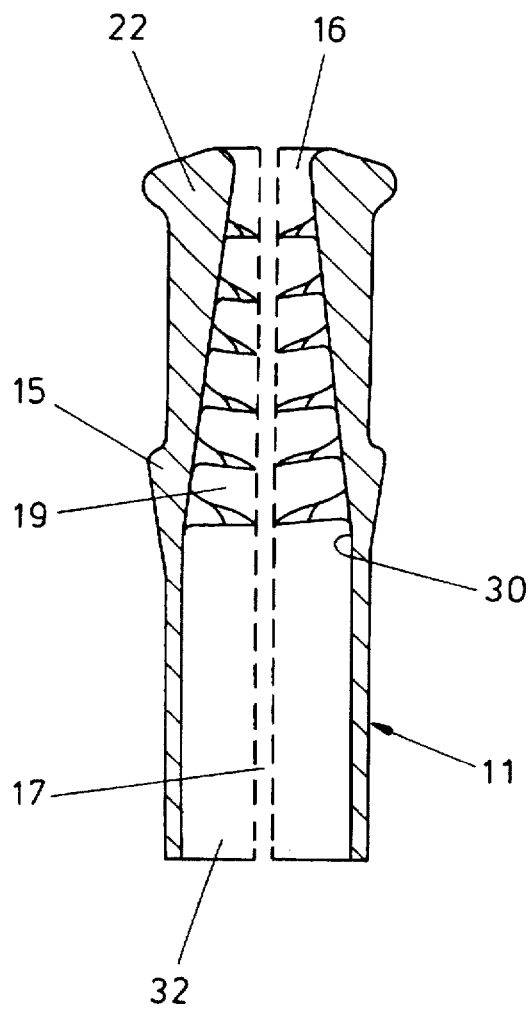
FIG. 4 is a longitudinal section through a cable locking and sealing device according to a second embodiment of the present invention.

Referring to FIG. 4 of the drawings, a cable locking and sealing device in accordance with a second embodiment of the present invention is similar in many respects to that of FIG. 2. However, in this case, the cylindrical body 11 has an internal diameter which is constant from the end 32 to a point 30 at or adjacent its mid-length, and then tapers to the end 16. The annular ribs 19 progressively increase in diameter accordingly down the length of the body 11.

Figure 5:
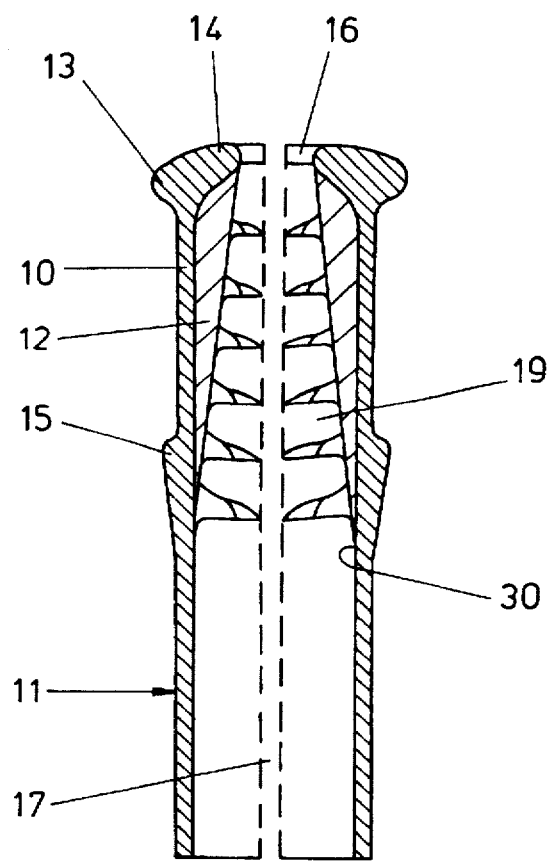
FIG. 5 is a longitudinal section through a cable locking and sealing device according to a second embodiment of the present invention, having an alternative construction.

Similarly, referring to FIG. 5 of the drawings, an alternative configuration of the cable locking and sealing device of the second embodiment of the present invention is similar in many respects to that of FIG. 3. However, in this case, the outer sleeve 10 has a generally uniform external diameter and the inner sleeve 12 tapers from its inner end 30 to merge with the inner periphery of the internal projection 14 at the end 16. The annular ribs 19 again progressively increase in diameter down the length of the body 11.

FIGS. 6 to 8 show successive stages in the procedure of introducing and securing a cable 26 in a cable entry port 24 of a cable splice enclosure indicated at 25, using a cable sealing and locking device as shown, for example, in FIG. 5. Initially the cable 26 is inserted into the device, by passing it through the slit 27 in the tubular body 11, such that the annular ribs 19 encircle the cable 26 and a portion of the cable 26 protrudes through the upper opening of the device; the insulation is cut back from the end of the cable 26 to bare end lengths of the individual conductors (or optical fibres) 27 which are to be spliced with the conductors (or optical fibres) of other cables entering the enclosure through similar cable entry ports of the enclosure. The installer then grips the cable 26 and the device 11 with his fingers and pulls them together through the tubular entry port 24 in the outwards direction relative to the enclosure, pulling the annular projection 15 through the port 24 as shown in FIG. 7, until finally the device reaches the position shown in FIG. 8. The above described action causes the annular ribs 19 to partially flex upwardly, to lie relatively flat against the cable 26. It will be appreciated that the inner sleeve 12 becomes radially compressed as the device 11 is pulled through the cable entry port 24, thus sealing the arch around the cable 26, and the edges of the slit 17 are pushed together, thus closing the gap. In the final position shown in FIG. 8, the external annular projection 13 of the device 11 abuts the inner end of the entry port 24 and the external projection 15 of the device abuts the outer end 23 of the entry port. Accordingly the annular projections 13, 15 prevent the device from moving in either axial direction and the cable is prevented from moving because it is firmly gripped by the device 11.

Figure 9:
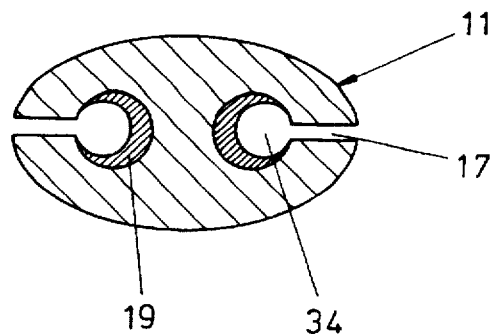
FIG. 9 is a plan view of a cable locking and sealing device according to a third embodiment of the present invention.

Referring to FIG. 9 of the drawings, a cable locking and sealing device in accordance with a third embodiment of the present invention may be of similar construction to any of those described above. However, in this case, the body 11 is of generally oval shape and has two parallel ducts 34 running pining. Longitudinal slits 17 extending from each duct 34 to the outer edge of the body 11 and running down its length are provided. A series of annular ribs 19 are formed around the interior circumference of each duct 34 which taper off towards both edges of the slits 17 such that the portions of the interior of each duct 34 which are directly adjacent each side of each slit 17 are substantially smooth.

Figure 10:
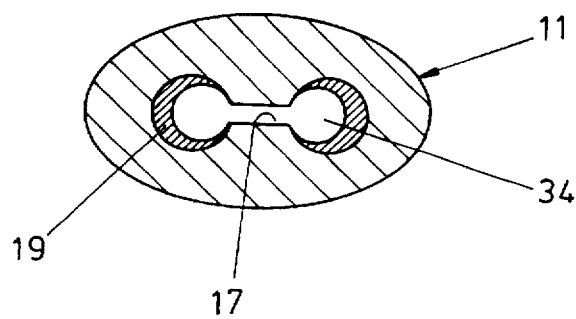
FIG. 10 is a plan view of a cable locking and sealing device according to a fourth embodiment of the present invention.

Referring to FIG. 10 of the drawings, a cable locking and sealing device in accordance with a fourth embodiment of the present invention is similar in most respects to that of FIG. 9. However, in this case, a single longitudinal slit 17 is provided between the ducts 34.

Figure 11:
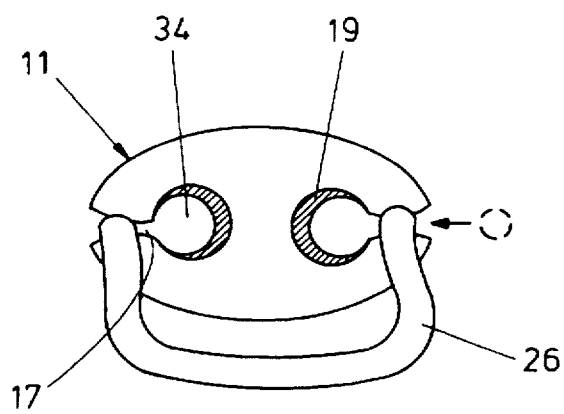
FIG. 11 is a plan view of the device of FIG. 9 having a cable fitted therein.
Figure 12:
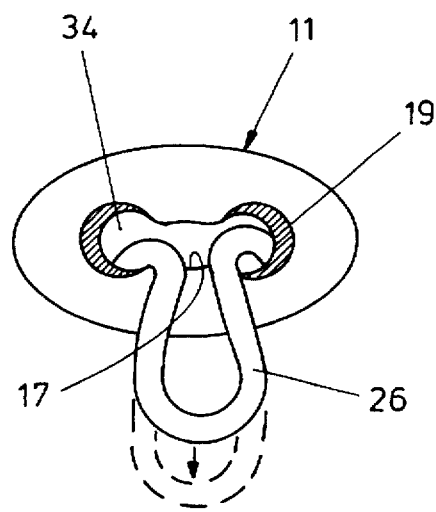
FIG. 12 is a plan view of the device of FIG. 10 having a cable fitted therein.

Referring to FIG. 11 of the drawings, in use each arm of a looped cable 26 is inserted into the appropriate duct 34 of the device 11 of FIG. 8 by passing it through the respective slit 17, such that the loop protrudes from the upper end of the device 11. However, each arm of a looped cable 26 is inserted into the appropriate duct 34 of the device 11 of FIG. 10 by forcing the looped portion of the cable 26 through the central slit 17 and then separating the arms of the loop such that each arm runs along a separate duct 34.

In either case, the cable locking and sealing device is inserted into a cable entry port and secured as described above with reference to FIGS. 6 to 8.

It will be appreciated that the slit or slits formed in each cable locking and sealing device described above need not extend along the whole of the length of the device, but may run along only part of its length.

We claim:

1. A cable locking and sealing device comprising an elongate body of elastomeric material, said elongate body having at least one through-passage for receiving a cable and at least one longitudinal slit extending down at least a portion of its length, a region of the interior of said at least one through-passage being formed with a series of annular ribs each tapering in depth to such an extent towards a point adjacent said at least one longitudinal slit that the internal surface of said through-passage immediately adjacent opposite sides of said slit is free of said ribs and smooth, said device being arranged to be pulled into an entry port so that the body of said device becomes radially compressed between said cable and said entry port.

2. A cable locking and sealing device as claimed in claim 1, wherein said elongate body comprises a first external annular projection at or adjacent one of its ends, and a second external annular projection intermediate said ends, arranged to abut opposite ends of said entry port and prevent movement of said device in an axial direction.

3. A cable locking and sealing device as claimed in claim 1, wherein said elongate body comprises an outer sleeve of relatively incompressible elastomeric material, and an inner sleeve of relatively soft elastomeric material.

4. A cable locking and sealing device as claimed in claim 1, wherein said elongate body comprises a single said through-passage and a single said longitudinal slit.

5. A cable locking and sealing device as claimed in claim 1, wherein said at least one through-passage is a pair of through-passages.

6. A cable locking and sealing device as claimed in claim 5, wherein said longitudinal slit joins said through-passages.

7. A cable locking and sealing device as claimed in claim 6, wherein said at least one longitudinal slit is a pair of slits, each joining one of said through-passages to the outer surface of said elongate body.

8. A cable locking and sealing device as claimed in claim 1, wherein said annular ribs are provided over only a portion of the length of said elongate body.

9. A cable locking and sealing device as claimed in claim 1, wherein the interior diameter of each said through-passage tapers along its length.

* * * * *